J. J. CUMMING.
Churn Dasher.
No. 68,049.
Patented Aug. 27, 1867.
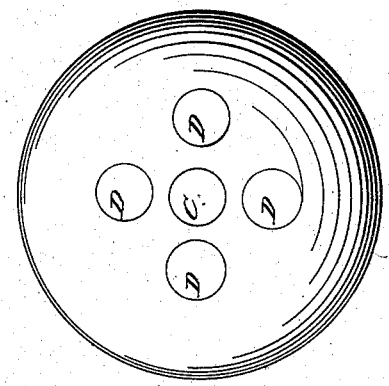
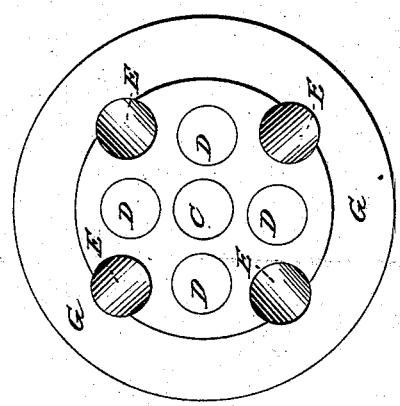
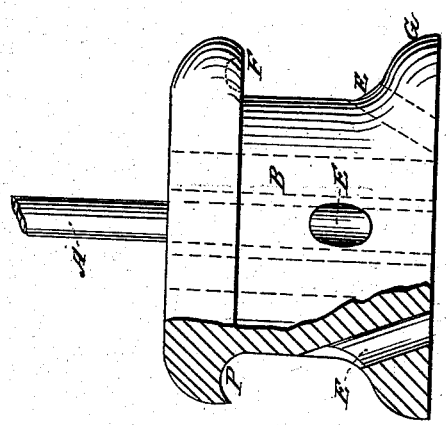
WITNESSES:
INVENTOR:

United States Patent Office.

JACOB J. CUMMING, OF INDEPENDENCE, MISSOURI.

Letters Patent No. 68,049, dated August 27, 1867.

IMPROVEMENT IN CHURN-DASHERS.

*The Schedule referred to in these Letters Patent and making part of the same.*

TO ALL WHOM IT MAY CONCERN:

Be it known that I, JACOB J. CUMMING, of Independence, in the county of Jackson, and State of Missouri, have invented a new and useful Improvement in Churn-Dashers; and I do hereby declare that the following is a full, clear, and exact description of the same, reference being had to the annexed drawing, making part of this specification, in which—

Figure 1 is a perspective view, partly in section.
Figure 2 is a top view, and
Figure 3 is a bottom view.

The same letters are employed in all the figures in the indication of identical parts.

A is the dasher-handle, inserted in the central hole C of the dasher B. The dasher is formed as follows: It is convex upon its upper face, and concave below. A series of holes is formed at D D, passing vertically through the dasher, arranged around the handle. Other holes, E E, are bored through the same, passing diagonally through the lower flange G, passing from the bottom upwards and diagonally, so as to open through the side of the dasher, and below the downwardly curving flange F. The cream compressed within the concavity below the dasher will, by its descent, be forced violently upwards through the openings D, and also through the diagonal openings E. The streams flowing through the latter channels will be directed against the under side of the curved flange F, by which its globules will be broken and the entire mass of cream greatly agitated.

I do not claim the openings through the dasher, whether vertical or diagonal, or any of the parts separately, but what I claim as my invention, and desire to secure by Letters Patent, is—

A churn-dasher, combining in its construction the following elements: The concave or dished bottom, the vertical openings D, the diagonal openings E, the lower flange G, and the upper downwardly-curved flange F, said parts being arranged substantially as set forth.

In testimony whereof I have signed my name to this specification in the presence of two subscribing witnesses.

JACOB J. CUMMING.

Witnesses:
  O. F. MYERS,
  WM. E. LEE.